United States Patent [19]
Beeler

[11] Patent Number: 5,597,242
[45] Date of Patent: Jan. 28, 1997

[54] BICYCLE HUB WITH BEARING PRELOAD ADJUSTER

[75] Inventor: Douglas C. Beeler, Ashville, N.C.

[73] Assignee: Dia-Compe, U.S.A., Inc., Fletcher, N.C.

[21] Appl. No.: 519,419

[22] Filed: Aug. 25, 1995

[51] Int. Cl.[6] .................................................. F16C 23/06
[52] U.S. Cl. ......................... 384/517; 384/519; 384/538; 384/545
[58] Field of Search ..................................... 384/458, 519, 384/517, 538, 542, 545

[56] References Cited

U.S. PATENT DOCUMENTS

| | | | |
|---|---|---|---|
| 2,711,356 | 6/1955 | Ensinger | 384/517 |
| 2,953,417 | 9/1960 | Horberg | 384/519 X |
| 3,438,650 | 4/1969 | Jaulmes | 384/545 X |
| 3,816,013 | 6/1974 | Schuhmann | 384/538 X |
| 4,531,847 | 7/1985 | F'Geppert | 384/538 X |

FOREIGN PATENT DOCUMENTS

| | | | |
|---|---|---|---|
| 1046145 | 12/1953 | France | 384/545 |
| 1409793 | 7/1988 | U.S.S.R. | 384/517 |

*Primary Examiner*—Thomas R. Hannon
*Attorney, Agent, or Firm*—Sixbey, Friedman, Leedom & Ferguson; David S. Safran

[57] ABSTRACT

A bicycle wheel or pedal crank hub with a bearing preload device in which an axle end cap that is attached to the end of an axle extending through the hub and supported on a bearing assembly is used for preloading the hub bearing assembly together with a split compression ring. For adjusting the preload on the hub bearing assembly, the compression ring is expanded or contracted causing a beveled surface of the compression ring to act on a bevel of either an annular circumferential flange of the axle end cap or a spacer disposed between the compression ring and the circumferential flange of the axle end cap.

9 Claims, 3 Drawing Sheets

BICYCLE HUB WITH BEARING PRELOAD ADJUSTER

BACKGROUND OF THE INVENTION

1. Field of the Invention

The present invention relates to bicycle hubs and more particularly to a bicycle hub having a bearing preload adjuster which is specially constructed to provide the necessary force to preload the bearing.

2. Description of Related Art

In bicycle hub devices generally, bearings, e.g., ball or roller bearings, are utilized to provide for free rotation between the hub and a part received therein, e.g., a wheel axle or a pedal crank. The bearings are contained in a bearing race and an end cap is secured to the bicycle hub to retain the bearing assembly in place. The end cap, usually threadingly engaged with the hub, is secured in a position to effectuate an axial preloading of the bearings necessary to attainment of proper rotational characteristics.

However, numerous manufacturing tolerances must be taken into account when using the end cap to preload the ball bearings against the bearing race of the hub, particularly since the ball bearings and hub base are often made by separate manufacturers. Therefore, there is a need for a bicycle hub assembly which will allow the ball bearings to be properly preloaded without being affected by large manufacturing tolerances. Additionally, there is a need for a bicycle hub having a bearing preload adjuster which will allow the bearing load to be easily adjusted, both when assembled and after wear and tear on the bicycle hub.

SUMMARY OF THE INVENTION

It is a primary object of the present invention to provide a bicycle hub with a bearing preload adjuster which will overcome the aforementioned shortcomings associated with the prior art.

Another object of the present invention is to provide a bicycle hub with a preload adjusting device which simplifies preloading the bearings in a bicycle hub.

Yet another object of the present invention is to provide an adjustable compression ring as the bearing preload adjuster.

It is also an object of the present invention to provide a bearing preload adjuster which allows for wider manufacturing tolerances.

Another object of the present invention is to provide a bicycle wheel hub with a bearing preload adjuster which separates the bearing preload from the clamping force of the axle end cap so that the axial force applied by a "quick release" wheel connector is transmitted through the solid axle and not through the hub and bearings when the wheel is installed.

It is still another object of the present invention to provide a bicycle wheel hub with a bearing preload adjuster which allows preload adjustment with the wheel on or off the bicycle.

Yet another object of the present invention is to provide a bicycle hub with a bearing preload adjuster which will retain the preload adjustment under normal use.

These as well as additional objects and advantages of the present invention are achieved by providing a bearing preload device for either a bicycle wheel hub or pedal crank hub wherein a passage is formed extending through the hub from one end of the hub to the other. An annular hub bearing assembly holding bearings is positioned between an inner and an outer race in at least one end of the passage. An axle extends through the passage and is supported by the hub bearing assembly. An axle end cap is attached to the end of the axle for retaining the hub bearing against the bicycle hub. The axle end cap includes a beveled annular extension (as an integral or separate part) and this bevel is acted upon by a compression ring that is positioned between the hub bearing and the beveled annular extension and the bearing assembly for adjusting the preload on the hub bearing assembly. The compression ring may comprise an annular collar having a beveled side facing to the bevel of the annular extension of the axle end cap. By compressing or expanding the annular collar via an adjustment screw, its diameter is changed in order to change the preloading force on the hub bearings.

DETAILED DESCRIPTION OF THE PREFERRED EMBODIMENTS

Figure 1:
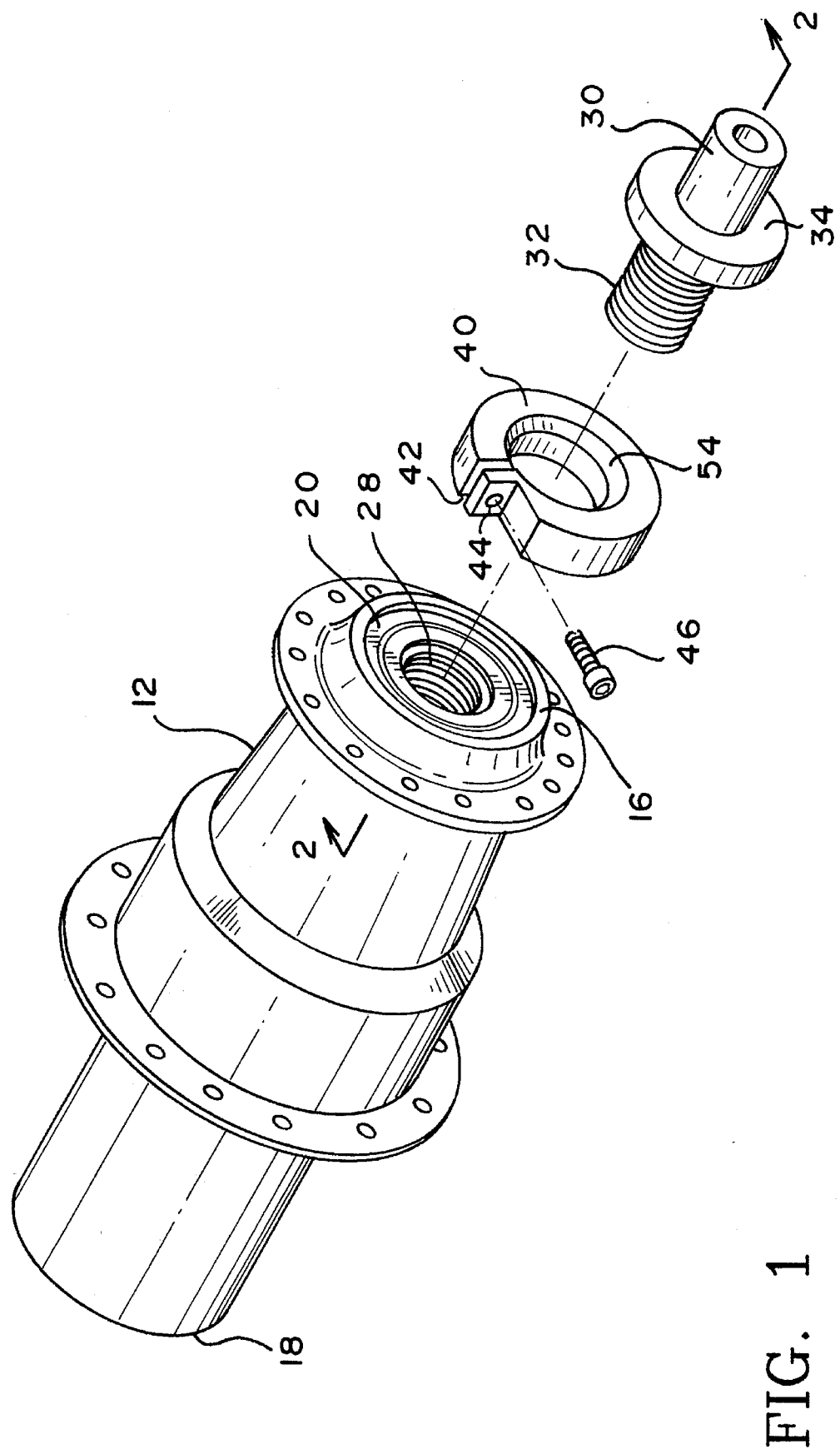
FIG. 1 is a perspective view a bicycle wheel hub in accordance with one embodiment of the invention.
Figure 2:
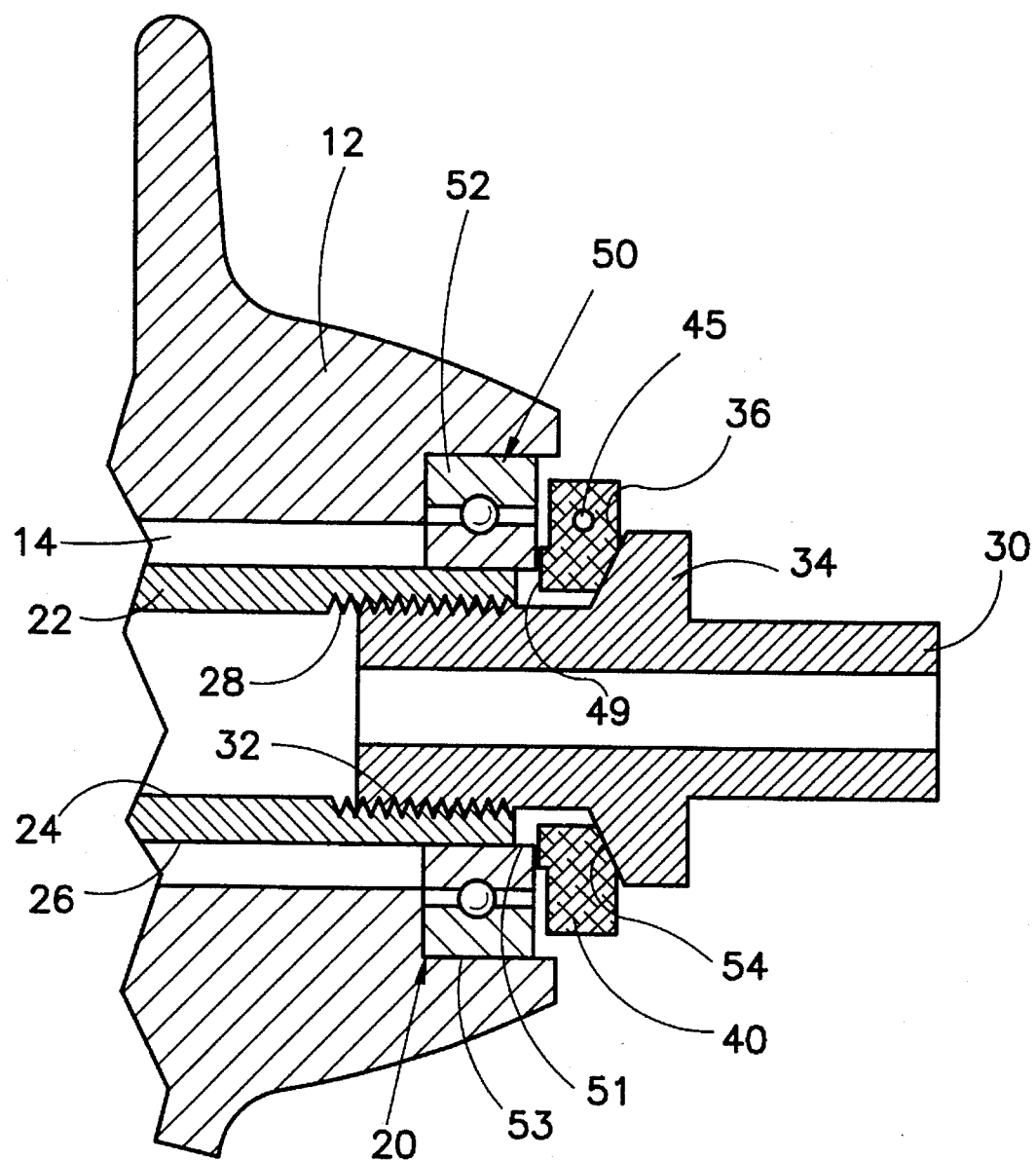
FIG. 2 is a sectional view of a portion of the hub in the vicinity of the bearing preload adjuster taken generally along line 2—2 of FIG. 1.

Referring now to FIGS. 1 and 2, the bearing preload adjuster 10 of the present invention is illustrated in conjunction with an otherwise conventional bicycle rear wheel hub 12 for a spoked bicycle wheel (although, it is equally applicable to wheel hubs for bicycle front wheels and to wheel hubs for bicycle wheels of the type which do not use spokes to attach the hub to the wheel rim). The bicycle hub 12 is generally cylindrical in shape and includes a passage 14, also cylindrical in shape, which extends through the center of the bicycle hub 12 from one end 16 of the hub 12 to the other end 18. The diameter of the passage 14 is enlarged at at least one end of the bicycle hub 12, so that an annular bearing-receiving recess 20 is formed in the passage 14.

A tubular axle 22 extends through the passage 14, and has a inner surface 24 with threaded ends 28 and a outer surface 26 that is smooth. The threaded ends 28 receive a threaded surface 32 of an axle end cap 30. The end cap 30 is cylindrical in shape except for an annular flange 34 extending about the perimeter of its outer surface. In this embodiment, the annular flange 34 is beveled on its side 36 which faces the end of the wheel hub 12, so that the width of the circumferential flange 34 tapers inwardly in a direction toward the hub 12.

The bearing preload adjuster 10 comprises a split annular compression ring 40 formed of a spring-like resilient material which has a peripheral gap 42 between its ends and a beveled surface 54. An unthreaded aperture 44 is formed in one end of the ring 40 and a threaded opening 45 is formed in the other end of the compression ring 40. The aperture 44 receives an adjusting screw 46 that passes through the aperture 44, across the gap 42 and is screwed into the threaded opening 45 placing the ring under pretension. The diameter of the compression ring 40 may then be adjusted through the use of adjusting screw 46 to expand and contract the ring 40, increasing and decreasing distance across the gap 42 between aperture 44 and opening 45 by virtue of the adjusting screw 46, via its threaded engagement with the threaded opening 45 in the end of the split compression ring 40, being able to pull together the ends of the ring 40 when the screw 46 is tightened and allowing the ends to spread apart under the inherent spring properties of the compression ring 40 when the adjustment screw 46 is loosened.

The inner diameter of the split annular compression ring 40 is large enough to enable the threaded end 32 of the axle end cap 30 to pass therethrough, but the diameter of the compression ring 40 is not sufficiently large to allow the circumferential flange 34 of axle end cap 30 to pass therethrough, the beveled surface 54 of the annular compression ring 40 abutting the beveled surface 36 of the circumferential flange 34. The compression ring 40 also includes an axial flange 49 extending from the side of the compression ring 40 that is opposite the side which includes the beveled surface 54.

Disposed within the annular recess 20 is an annular hub bearing assembly 50 that can be of any known design, but in the illustrated case has ball bearings 52 rotatably retained in a bearing ring 51 formed of inner and outer bearing races (the inner race engaging the axle surface 26 and the outer race engaging the facing surface of hub recess 20). The bearings 52 enable the outer surface 26 of the axle to roll on the bearings relative to the inner radially facing surface 53 of the hub recess 20. The hub bearing assembly 50 is axially held in place, on one side, by the axially facing surface of the annular recess 20, and on the other side, by the annular compression ring 40, compression ring 40 being held in abutment with the hub bearing assembly 50 by the circumferential flange 34 of the axle end cap 30. More specifically, the axial flange 49 of the compression ring 40 abuts only the inner race of the bearing ting 51 of the hub bearing assembly 50 in the case of such a sealed type bearing. In the case of an open type bearing, the flange 49 would be designed to contact the bearing cone of the bearing assembly.

Since the annular compression ring 40 is positioned between the axle end cap 30 and the hub bearing assembly 50. When axle end cap 30 is affixed to the axle 22, the end cap 30 will be threaded into the axle 22 until the circumferential flange 34 abuts annular compression ring 40 and forces the compression ting 40 toward the bicycle wheel hub 12 until it abuts the hub bearing assembly 50. Once the hub bearing assembly 50 and annular compression ring 40 are retained in place by axle end cap 30, the bearing preload can be adjusted to the desired amount by annular compression ring 40. In particular, by adjusting the diameter of the annular compression ring 40 using the adjusting screw 46, as described previously, the beveled surface 54 of the split annular compression ring 40 will press against the beveled surface 36 of circumferential flange 34, applying an axially directed force thereto. As the compression ring 40 is contracted, the force created by the beveled surfaces 36 and 54 will force the compression ring toward the wheel hub 12 and bearing assembly 50. This movement will, accordingly, apply an axial a preload on the bearings due to the imposition of opposing forces on the hub bearing assembly 50 by the hub 12 and the compression ring 40.

Figure 3:
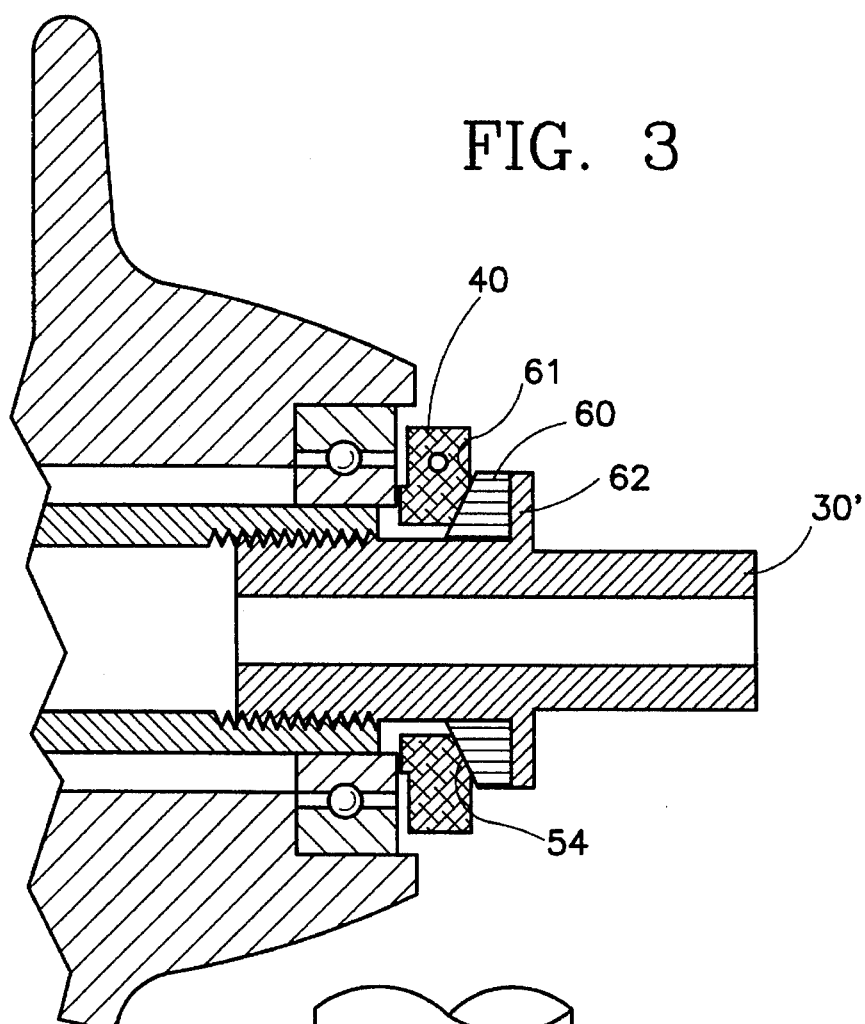
FIG. 3 is sectional view corresponding to that of FIG. 2, but showing an alternative embodiment of the bearing preload adjuster.

Referring now to FIG. 3, an alternative embodiment of the bearing preload adjustment mechanism of the present invention is illustrated. This embodiment differs from that of FIG. 2 solely in that a separate annular spacer 60 having a beveled side 61 is used with an axle end cap 30' having a disc-shaped flange 62, instead of the end cap 30 having the circumferential flange 34 with an integral bevel, i.e., as a comparison of FIGS. 2 & 3 shows, the combined end cap 30' and spacer 60, together, correspond directly in shape to the end cap 30. Circumferential flange 62 extends around the outer periphery of end axle cap 30', and annular spacer 60 is positioned around axle end cap 30 between circumferential flange 62 and the compression ring 40. The spacer 60 is positioned so that the beveled side 61 is adjacent to the beveled surface 54 of compression ring 40. The beveled spacer 40 allows devices having axle end caps which are not beveled to be adapted for use with the compression ring 40 of the present invention.

Figure 4:
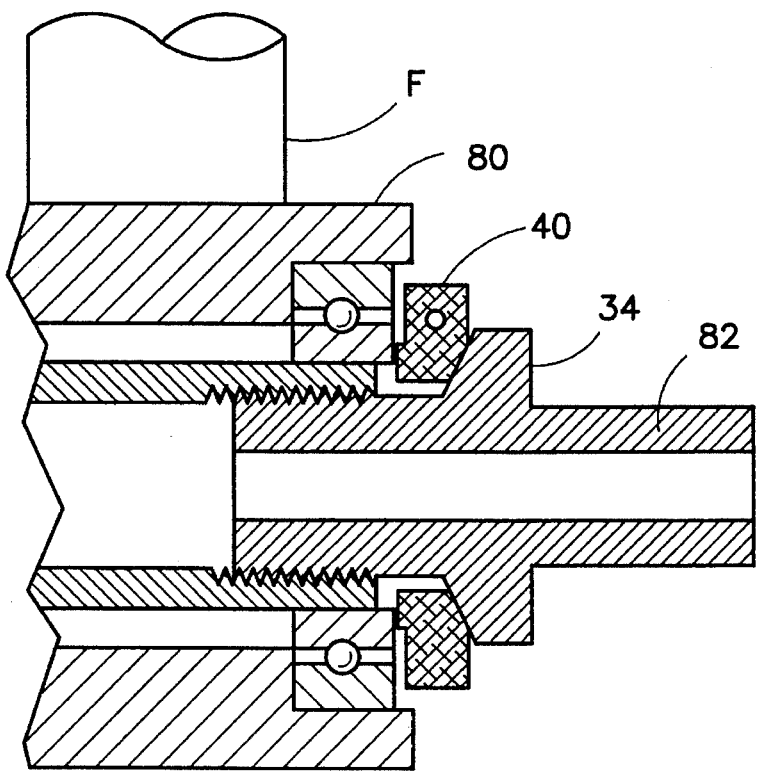
FIG. 4 is section corresponding to view that of FIG. 2, but where the bearing preload adjuster is incorporated into a bicycle frame pedal crank hub.

Referring now to FIG. 4, the bearing preload adjuster described above in FIG. 1–2 is show applied to a pedal crank hub 80 of a conventional bicycle frame F (only one post of which is shown in addition to crank hub 80 which forms an integral part thereof). Here, the components of the bearing preload adjuster function in the same manner as described above relative to the bicycle wheel hub 12, the only difference being that an end cap 82 that serves as a pedal axle extension upon which the pedal crank of a bicycle pedal assembly would be attached in a usual manner, such as by threading, bolting, etc., acts on the split compression ring 40 instead of wheel axle end cap 30. Of course, the modified embodiment of FIG. 3 could be used with a bicycle frame pedal crank hub as well, merely by substituting a spacer 60 and a pedal axle extension end cap in the form of end cap 30' for that shown in FIG. 4.

As can be seen from the foregoing, utilizing a split annular compression ring 40 to preload the bearings realizes numerous advantages over using the axle end cap 30 to achieve the same purpose. The bearing preload mechanism allows for wider tolerances by being able to expand to account for deviations in the axial dimensions. The compression ring 40 also separates the bearing preload from the clamping force applied by the end cap 30 so that, when the wheel is installed, the axial force from the quick release is transmitted through a solid axle rather than through the hub and bearings. Furthermore, having the preload adjustment independent of the axle end caps allows the adjustment to be performed with the wheel either on or off of the bicycle. The compression ring 40 is also more simply adjusted with a single tool than previous methods requiring one tool to secure the axle and another to adjust a nut. The compression ring 40 further increases adjustment reliability as it is not prone to lose the preload adjustment under normal use, as is the case for those systems which use an axle end cap for bearing preloading purposes. On the other hand, should, for example, bearing wear necessitate a preload adjustment, such can be easily accomplished.

It is also pointed out that even though the hub is shown with a bearing assembly on only one end of the axle, it should be appreciated that normally both ends of the axle are supported in bearing assemblies. In the drawings, the inventive bearing preload load adjuster shown at one side of the hub and the other side is not shown since it is sufficient to provide a preload adjuster at one side with a conventional bearing arrangement without a preloading device at the other side, and since it is not normally economically practical to provide a preload adjuster at both sides. However, particularly in the case of hubs for bicycle front wheel, it is fully possible to provide the inventive bearing preload adjuster at both sides of the hub to increase the precision with which the bearing preload can be set.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. A bicycle hub with a bearing preload device comprising:

a cylindrical hub having two ends, said hub including a passage extending from one end of said hub, through said hub, to the other end of said hub;

a hub bearing assembly positioned in said passage;

an axle positioned within said passage of said hub and rotatably supported upon said bearing assembly;

an axle end cap adjustably and detachably attached to an end of said axle, said axle end cap having a circumferential flange;

a compression means for adjusting an axial preload on the hub bearing by expansion and contraction thereof; said compression means being positioned around said axle end cap between the circumferential flange of said axle end cap and said hub bearing assembly and in engagement therewith;

wherein said circumferential flange of said axle end cap has a bevel at a side thereof which faces the bearing assembly.

2. The bicycle hub as defined in claim 1, wherein said compression means comprises a split annular collar, and adjustment means for expanding and contracting said split annular collar; wherein a side of said annular collar facing said bevel is beveled.

3. The bicycle hub as defined in claim 2, wherein said adjustment means comprises an adjustment screw for changing the diameter of said annular collar in order to change the preloading force on the bearing assembly.

4. The bearing preload device as defined in claim 3, wherein said cylindrical hub is a bicycle wheel hub for a bicycle wheel.

5. The bearing preload device as defined in claim 3, wherein said cylindrical hub is a pedal crank hub of bicycle frame for mounting of a pedal crank.

6. A bicycle hub with a bearing preload device comprising:

a cylindrical hub having two ends, said hub including a passage extending from one end of said hub, through said hub, to the other end of said hub;

a hub bearing assembly positioned in said passage;

an axle positioned within said passage of said hub and rotatably supported upon said bearing assembly;

an axle end cap adjustably and detachably attached to an end of said axle, said axle end cap having a circumferential flange;

a compression means for adjusting an axial preload on the hub bearing by expansion and contraction thereof; said compression means being positioned around said axle end cap between the circumferential flange of said axle end cap and said hub bearing assembly and in engagement therewith;

wherein said circumferential flange of said axle end cap has a bevel at a side thereof which faces the bearing assembly;

further comprising a spacer positioned between said circumferential flange and said compression means; wherein a bevel is provided on a side of said spacer facing said compression means.

7. The bicycle hub as defined in claim 6, wherein said compression means comprises a split annular collar, and adjustment means for expanding and contracting said split annular collar; wherein a side of said annular collar facing said bevel is beveled.

8. The bicycle hub as defined in claim 7, wherein said adjustment means comprises an adjustment screw for changing the diameter of said annular collar in order to change the preloading force on the bearing assembly.

9. The bearing preload device as defined in claim 8, wherein cylindrical hub is a bicycle wheel hub for a bicycle wheel.

* * * * *